(12) United States Patent
Bouillon et al.

(10) Patent No.: US 9,896,333 B2
(45) Date of Patent: Feb. 20, 2018

(54) PROCESS FOR THE PRODUCTION OF HYDROGEN WITH TOTAL RECOVERY OF $CO_2$ AND RECYCLING OF UNCONVERTED METHANE

(71) Applicant: IFP ENERGIES NOUVELLES, Rueil-Malmaison (FR)

(72) Inventors: Pierre Antoine Bouillon, Lyons (FR); Raphael Huyghe, Saint Andeol le Chateau (FR); Rafael Lugo, Bezons (FR); Fabrice Giroudiere, Orlienas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/160,787

(22) Filed: May 20, 2016

(65) Prior Publication Data

US 2016/0264417 A1 Sep. 15, 2016

Related U.S. Application Data

(63) Continuation of application No. 12/621,825, filed on Nov. 19, 2009, now abandoned.

(30) Foreign Application Priority Data

Nov. 20, 2008 (FR) ...................... 08 06509

(51) Int. Cl.
*C01B 3/48* (2006.01)
*B01D 53/14* (2006.01)
(Continued)

(52) U.S. Cl.
CPC ............ *C01B 3/48* (2013.01); *B01D 53/1475* (2013.01); *B01D 53/1487* (2013.01);
(Continued)

(58) Field of Classification Search
CPC .................................................. B01D 53/1475
See application file for complete search history.

(56) References Cited

U.S. PATENT DOCUMENTS

| | | | |
|---|---|---|---|
| 2,399,723 A | 5/1946 | Crowther et al. | |
| 3,727,049 A * | 4/1973 | Saunders ........... | G01N 33/2847 250/343 |

(Continued)

FOREIGN PATENT DOCUMENTS

| | | |
|---|---|---|
| EP | 1146009 A1 | 10/2001 |
| EP | 1582502 A1 | 10/2005 |

OTHER PUBLICATIONS

Search Report of FR0806509; dated May 15, 2009.

*Primary Examiner* — Paul Wartalowicz
(74) *Attorney, Agent, or Firm* — Millen, White, Zelano and Branigan, P.C.

(57) ABSTRACT

This invention relates to a process for the production of hydrogen from a hydrocarbon feedstock and steam comprising:
  A stage for the production of a synthesis gas in a unit for the steam-reforming of the hydrocarbon feedstock,
  A stage for shift conversion with steam of the synthesis gas that is obtained in the preceding stage producing a hydrogen stream that contains methane and carbon dioxide,
  A stage for recovering carbon dioxide and methane, present in the stream that is obtained in the shift conversion stage, in the form of hydrates that produce a stream of pure hydrogen,
  A stage for regeneration of methane,
  A stage for recycling methane to steam reforming.

8 Claims, 2 Drawing Sheets

(51) Int. Cl.
*B01D 53/62* (2006.01)
*B01D 53/96* (2006.01)
*C01B 3/52* (2006.01)
*C10L 3/08* (2006.01)
*C10L 3/10* (2006.01)
*F02C 3/22* (2006.01)

(52) U.S. Cl.
CPC ......... *B01D 53/1493* (2013.01); *B01D 53/62* (2013.01); *B01D 53/96* (2013.01); *C01B 3/52* (2013.01); *C10L 3/08* (2013.01); *C10L 3/108* (2013.01); *F02C 3/22* (2013.01); *B01D 2256/16* (2013.01); *B01D 2257/504* (2013.01); *B01D 2257/7022* (2013.01); *C01B 2203/0216* (2013.01); *C01B 2203/0233* (2013.01); *C01B 2203/0283* (2013.01); *C01B 2203/048* (2013.01); *C01B 2203/0415* (2013.01); *C01B 2203/0475* (2013.01); *C01B 2203/0811* (2013.01); *C01B 2203/0822* (2013.01); *C01B 2203/0827* (2013.01); *C01B 2203/1241* (2013.01); *C01B 2203/142* (2013.01); *C01B 2203/148* (2013.01); *C01B 2203/84* (2013.01); *C01B 2203/86* (2013.01); *Y02C 10/04* (2013.01); *Y02C 10/06* (2013.01); *Y02P 20/128* (2015.11); *Y02P 20/152* (2015.11); *Y02P 30/30* (2015.11)

(56) References Cited

U.S. PATENT DOCUMENTS

| | | | |
|---|---|---|---|
| 3,923,813 A * | 12/1975 | Vanhoof | C07C 309/00 514/821 |
| 4,695,442 A | 9/1987 | Pinto et al. | |
| 4,821,794 A * | 4/1989 | Tsai | C09K 5/063 165/10 |
| 5,382,417 A * | 1/1995 | Haase | B01D 53/1493 423/210 |
| 5,434,330 A | 7/1995 | Hnatow et al. | |
| 5,536,893 A | 7/1996 | Gudmundsson | |
| 5,644,911 A | 7/1997 | Huber | |
| 5,669,960 A | 9/1997 | Couche | |
| 6,106,595 A | 8/2000 | Spencer | |
| 6,352,576 B1 | 3/2002 | Spencer et al. | |
| 6,521,143 B1 | 2/2003 | Genkin et al. | |
| 6,747,179 B1 | 6/2004 | Desimone et al. | |
| 2003/0072716 A1 | 4/2003 | Poovathinthodiyil et al. | |
| 2003/0191196 A1 | 10/2003 | Madhubhai et al. | |
| 2005/0107648 A1 | 5/2005 | Kimura et al. | |
| 2005/0210881 A1 | 9/2005 | Balan et al. | |
| 2005/0274258 A1 | 12/2005 | Spencer | |
| 2009/0255181 A1 | 10/2009 | Rhinesmith et al. | |

* cited by examiner

PROCESS FOR THE PRODUCTION OF HYDROGEN WITH TOTAL RECOVERY OF $CO_2$ AND RECYCLING OF UNCONVERTED METHANE

This invention relates to the field of the production of hydrogen, and more particularly a process for the production of hydrogen with total recovery of $CO_2$ and recycling of unconverted methane.

Global warming, observed since the industrial era according to the international scientific community, could dramatically modify the climates and ecosystems of numerous regions of the globe. Emission of greenhouse gas and especially carbon dioxide ($CO_2$) seems to be responsible for this warming.

Fossil energy (natural gas, petroleum, carbon) constitutes a large part of the energy that is readily available on the planet. This fossil energy, however, when it is used, produces $CO_2$ (generally during a combustion stage) and is thus implicated in global warming.

One of the solutions that is recommended for fighting against the global warming by greenhouse gas emissions is to recover the $CO_2$ that is produced and then to store it under ground. Several methods are explored, including recovery by precombustion that consists in converting fossil energy into hydrogen with recovery and storage of the $CO_2$ that is co-produced. Hydrogen, an energy vector, can then be burned freely with no greenhouse gas emissions.

There are currently several means for producing hydrogen industrially—and thus electricity—starting from fossil energy. The most widely used means is the steam reforming of natural gas that is implemented in a furnace (in English: SMR: Steam Methane Reforming) that offers the advantage of using a feedstock that has a high hydrogen/carbon ratio, taking into account the high methane content in its composition. In a simplified way, the SMR catalytic reaction can be written in the following manner:

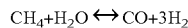

$$CH_4 + H_2O \leftrightarrow CO + 3H_2$$

This very endothermic reaction is balanced. It is promoted by high temperatures and is carried out in general in a furnace that is heated by a fuel such as natural gas. The SMR unit is conventionally followed by a shift conversion stage (WGS: Water Gas Shift) that makes it possible to maximize the production of hydrogen by the following reaction:

$$CO + H_2O \leftrightarrow CO_2 + H_2$$

When it is necessary to recover $CO_2$ for the purpose of storing it, it is then possible to use an amine washing unit (activated MDEA, for example) that extracts the $CO_2$ from the rich hydrogen stream, which is then sent, for example, into a gas turbine for the purpose of producing electricity, while the $CO_2$ is compressed and sent back under ground.

One major drawback in this type of process resides in the fact that the SMR reaction is not complete. The hydrogen-rich stream that is produced contains a large quantity of methane that is not converted in the conversion state to vapor and that is not recovered during amine washing. The resultant hydrogen containing methane therefore emits $CO_2$ when it is burned. The objective of $CO_2$ recovery is therefore not completely achieved by such a process, and only between 75% and 80% maximum of $CO_2$ is recovered.

An improvement to this technique consists in adding a pressure-modulated molecular-sieve adsorption unit (PSA) to improve impurities. At this time, two streams are obtained: a typically 99.99% pure hydrogen stream, and a stream of impurities containing at least 20% hydrogen. This low-pressure stream is sent into the burners of the steam-reforming furnace, which reduces the natural gas that is necessary for the furnace, and therefore the production of $CO_2$. However, this process offers major drawbacks, and in particular:

The purging of the PSA unit that contains methane is at low pressure and is therefore difficult to recycle economically in the SMR process because its recompression would consume too much energy and would be too expensive. When the PSA purge stream is used in the burners of the furnace for steam-reforming natural gas, the $CO_2$ that is generated by the combustion of methane that is present in the PSA purge stream is not recovered.

A significant portion of the hydrogen is lost with the purging of the PSA unit.

This process therefore makes it possible to obtain pure hydrogen (free of methane), but it does not make it possible to recover the $CO_2$ that will be emitted during the combustion of the separated methane.

Another process for the production of hydrogen combined with the process for the production of electricity (called the Hygensys® process) is also known. This process that is based on the same one as that previously described proposes burning—in a suitable combustion chamber, replacing the PSA unit—the stream of hydrogen that is produced so as to produce electricity without $CO_2$ emissions. The hot gases that are obtained from the combustion are used via an exchanger reactor (Hygensys®) to provide the energy that is necessary to the steam-reforming reaction. The Hygerisys® process implements the reaction for steam-reforming the natural gas in a compact reactor-exchanger that is heated by convection and integrated with a gas turbine. This concept allows a strong thermal integration and leads to the co-production of hydrogen and electricity, while facilitating the recovery of $CO_2$. This process, however, has the following drawbacks:

A significant proportion of $CH_4$ remains in the $H_2$ stream, which entrains a limited $CO_2$ recovery rate (maximum 80%) over the entire process.

The $CO_2$ is produced at low pressure (amine), which will require a subsequent compression.

This process therefore makes possible the production of electricity with recovery of $CO_2$ at an advantageous yield starting from methane, but shows a recovery rate that is limited by the conversion of the vapor-reforming unit.

This invention therefore has as its object to remedy one or more of the drawbacks of the prior art by proposing a process for the production of hydrogen that makes it possible to recover $CO_2$ and methane, and to recycle methane to the steam-reforming stage without a loss of energy.

For this purpose, this invention proposes a process for the production of hydrogen starting from a hydrocarbon feedstock and steam comprising:

A stage for the production of a synthesis gas in a unit for steam-reforming the hydrocarbon feedstock with a fuel that provides the heat that is necessary to the reaction, A stage shift conversion of the synthesis gas that is obtained in the preceding stage producing a hydrogen stream that contains methane and carbon dioxide, A stage for recovery of carbon dioxide and methane, present in the stream that is obtained in the shift conversion stage, in the form of hydrates that produce a pure hydrogen stream, A stage for regeneration of methane, A stage for recycling methane to steam reforming.

According to one embodiment of the invention, the stage for recovery of carbon dioxide and methane in hydrate form is followed by a stage for regeneration of carbon dioxide.

According to another embodiment of the invention, a stage for regeneration of carbon dioxide is carried out at the same time as the stage for regeneration of methane.

In one embodiment of the invention, the hydrocarbon feedstock is natural gas.

In one embodiment of the invention, the stage for recovery of carbon dioxide and methane in hydrate form is carried out in a mixture that comprises water and a non-water-miscible solvent.

In one embodiment of the invention, this mixture also comprises at least one amphiphilic compound.

In one embodiment of the invention, the recovery stage in hydrate form is carried out at a temperature of between 0 and 60° C. and a pressure of between 0.2 and 6 MPa.

In one embodiment of the invention, the stage for regeneration of carbon dioxide is carried out at a temperature of between 0 and 40° C. and a pressure of between 0.2 and 6 MPa.

In one embodiment of the invention, the stage for regeneration of methane is carried out at a temperature of between 0 and 40° C. and a pressure of between 0.2 and 6 MPa.

According to one embodiment of the invention, the stage for regeneration of carbon dioxide and methane is carried out at a temperature of between 0 and 40° C. and a pressure of between 0.2 and 6 MPa.

According to one embodiment of the invention, the methane stream that is obtained by regeneration is recycled at the input of the vapor-reforming stage.

According to one embodiment of the invention, the process for the production of hydrogen comprises a stage for the production of electricity from the hydrogen stream that is obtained in the stage for recovery of carbon dioxide and methane.

According to one embodiment of the invention, the production of electricity is carried out by sending the hydrogen stream into a combustion chamber.

According to one embodiment of the invention, the hot flue gases obtained at the end of the combustion stage are recycled to the vapor-reforming reactor.

BRIEF DESCRIPTION OF DRAWINGS

Other characteristics and advantages of the invention will be better understood and will emerge more clearly from reading the description that is given below by referring to the accompanying figures, given by way of example:

As illustrated in FIGS. 1, 2, 3 and 4, during the process for the production of hydrogen, a stream of natural gas that circulates in a pipe (1) and a stream of steam that circulates in a pipe (2) are sent as feedstock into a steam-reforming unit (SMR) (11). The heat that is necessary to the reaction is produced by a fuel stream, for example natural gas, sent into the steam-reforming furnace, and by a recycled hydrogen stream. At the output of the furnace (110), this reaction produces a stream of flue gases that contain CO2. The stream of synthesis gas that circulates in a pipe (30) that is obtained by the steam-reforming reaction primarily contains hydrogen ($H_2$), carbon monoxide (CO), carbon dioxide ($CO_2$), as well as steam ($H_2O$), and a small amount of methane that has not reacted ($CH_4$), because the reaction is balanced, and even at a temperature of 900° C., about 4 mol % of methane that has not reacted remains. This stream of synthesis gas is sent via a pipe (30) to the shift conversion unit (12). In this unit, the bulk of the carbon monoxide is converted into carbon dioxide using steam, releasing more hydrogen at the same time. This reaction is also balanced, and there is ultimately left a little carbon monoxide (0.5% under intense conversion conditions). At the output of the conversion unit (12), the conversion stream that is obtained that circulates in a pipe (40) therefore contains hydrogen, carbon dioxide, water, methane, and traces of carbon monoxide.

In the process according to the invention (illustrated in FIGS. 2, 3, and 4), the shift conversion stream is then sent to a unit for formation of hydrates (R1), contrary to the process of the prior art (illustrated in FIG. 1) where it is directed toward an amine unit (13) that uses methyl diethylamine (MDEA) in combination with at least one other amine, whereby this amine unit is followed either by a molecular-sieve adsorption unit of impurities, modulated in pressure (PSA process), or with a combustion chamber (15) for the purpose of producing electricity.

The unit for the formation of hydrates of $CO_2$ and methane consists of a reaction chamber or reactor (R1) in which the $CO_2$ and the methane are converted into $CO_2$ hydrates and methane.

The hydrates that are formed are binary hydrates, i.e., a mixture of hydrates of $CO_2$ and methane. The $CO_2$—$CH_4$ mixture forms hydrates with structure sI (carbon dioxide, methane, trimethylene oxide) or of type sII (methane-ethane, propane, tetrahydrofuran, trimethylene oxide) with the use of promoter additives (for example tetrahydrofuran).

Figure 2:
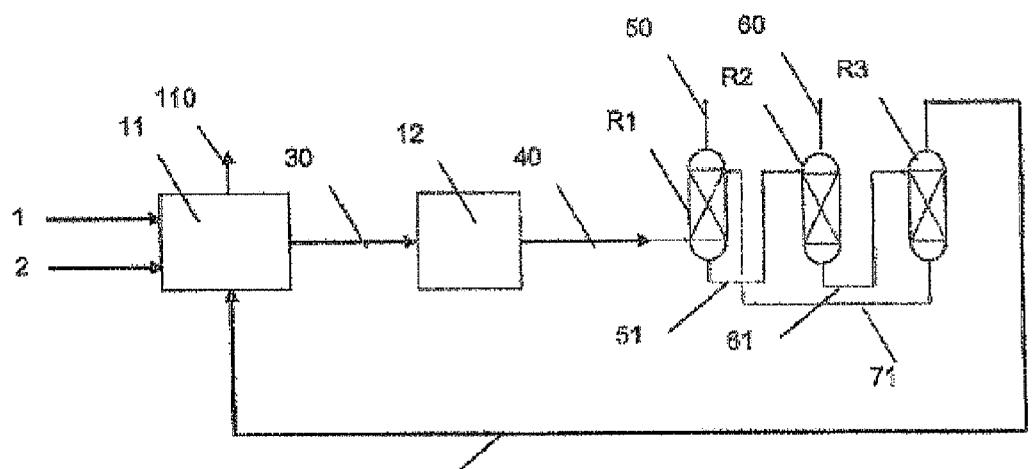
FIG. 2 shows the diagram of the process for the production of hydrogen according to the invention.
Figure 3:
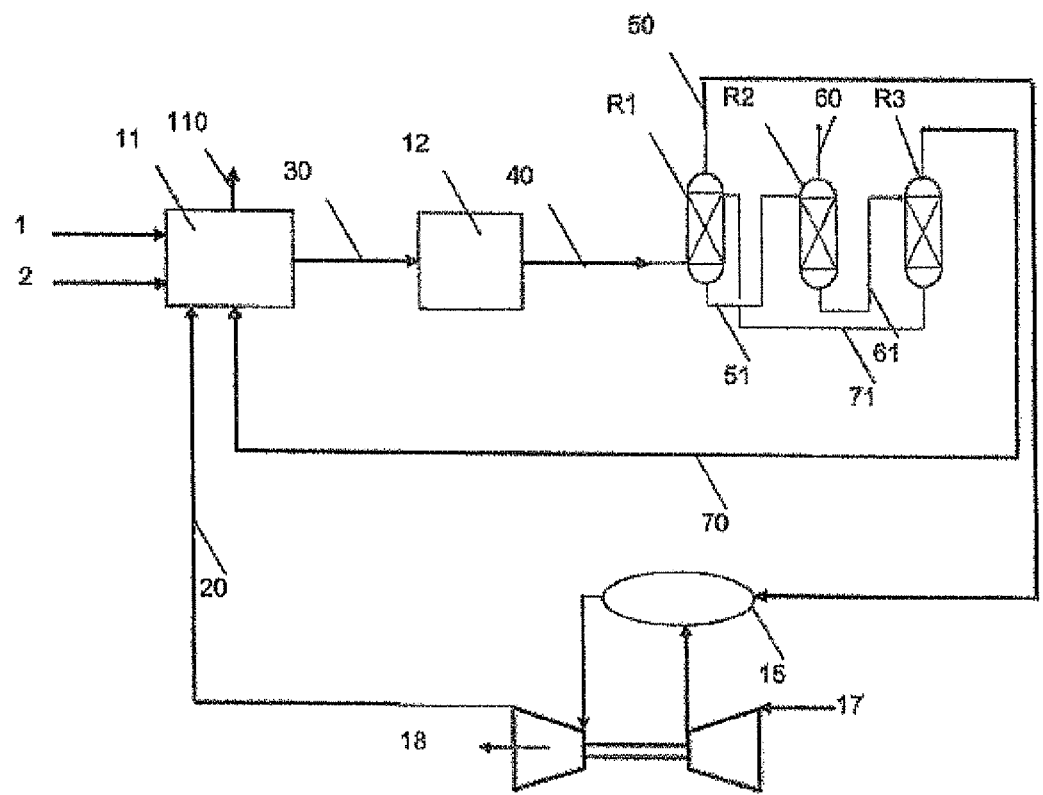
FIG. 3 shows a variant of the diagram for the production of hydrogen according to the invention for the production of electricity.
Figure 4:
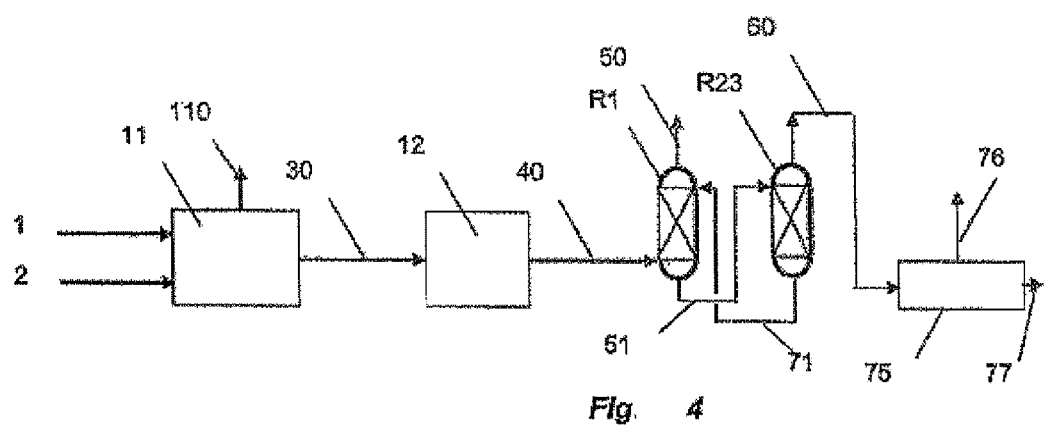
FIG. 4 shows a variant of the diagram for the production of hydrogen according to the invention.

As illustrated in FIGS. 2, 3, and 4, the shift conversion stream arrives in the chamber (R1) at a pressure of generally between 0.2 and 4 MPa, and preferably between 2 and 3.5 MPa. The temperature in the chamber (R1) is between 0 and 60° C., and preferably between 10 and 20° C. This stream is brought into contact with a mixture of at least two non-miscible liquid phases, at least one of which consists of water and preferably amphiphilic molecules (presented in detail below). The shift conversion stream and the liquid phases are brought into contact under conditions of pressure and temperature that are compatible with the formation of a hydrate phase that consists of acid and water compounds. This formation can be assisted by the addition of one or more suitable additives. This stage makes possible the sequestration of a large proportion of $CO_2$ and methane in the hydrate phase, and thus makes it possible to purify hydrogen. The hydrate particles of $CO_2$ and methane are dispersed into the non-water-miscible liquid and transported in the form of a suspension of solids. The thus purified hydrogen therefore contains little $CO_2$ and methane.

The purified hydrogen stream is evacuated from the chamber via the pipe (50). This stream contains only a few traces of $CO_2$ and methane.

According to one variant of the invention, illustrated in FIGS. 2 and 3, the stream of hydrates of $CO_2$ and methane is brought via the pipe (51) to a second reaction chamber (R2). This second chamber (R2) is used to carry out the regeneration of $CO_2$. To regenerate the $CO_2$ that is found in hydrate form, it is necessary that the interior of the second chamber (R2) be at a temperature of in general between 0 and 40° C., preferably between 10 and 20° C., and at a pressure of between in general 0.2 and 6 MPa, preferably between 2 and 4 MPa. At this stage of the process, only $CO_2$ is regenerated. Methane is also found in hydrate form. The regenerated $CO_2$ is evacuated via the pipe (60). This $CO_2$ stream is virtually pure and contains very little methane and hydrogen.

This stream of $CO_2$ is then sent to a compression and drying unit to then be transported to a reinjection site, such as a played-out deposit or a suitable geological layer.

Following the second chamber (R2), a third reaction chamber (R3) is arranged. The non-regenerated stream of methane hydrates that is in the second chamber (R2) is sent into this third chamber (R3) via the pipe (61) to regenerate methane. In the same way as for the regeneration of $CO_2$, it is necessary that the interior of the chamber (R3) be at a certain temperature and a certain pressure. To regenerate the methane that is found in hydrate form, it is necessary that the interior of the second chamber (R3) be at a temperature that is in general between 0 and 40° C., preferably between 0 and 20° C., and at a pressure that is in general between 0.2 and 6 MPa, and preferably between 2 and 4 MPa. The methane stream that is obtained thus contains very little $CO_2$ and hydrogen.

The regenerated methane stream is then recycled to the steam-reforming reactor via the pipe (70). The solvent that no longer contains hydrate is itself recycled via the pipe (71) to the first reaction chamber (R1) for the formation of hydrates.

In one variant of the invention, the second chamber (R2) is used for regenerating methane, and the third chamber (R3) is used for regenerating $CO_2$.

In another variant of the process that is described according to FIG. 4, the reactor (R23) is used under conditions such that all of the hydrates of $CO_2$ and methane are regenerated. The temperature is then in general between 0 and 40° C., preferably between 20 and 30° C., and at a pressure that is in general between 0.2 and 6 MPa, preferably between 2 and 4 MPa. The regenerated solvent (71) no longer contains hydrate and is recycled to the reactor (R1), while the gas stream that contains methane and $CO_2$ is directed to a separation unit (75) via the pipe (60). This unit is used in one stage that implements, for example, a process such as a chemical absorption so as to separate $CO_2$ and methane. In this embodiment, the methane that is obtained at high pressure is recycled via the pipe (77) in the steam-reforming reactor without additional compression; the $CO_2$ that is obtained at low pressure is evacuated via the pipe (76) and is optionally compressed for transport.

As illustrated in FIG. 3, the purified hydrogen stream that is obtained can then be used, for example, in the production of electricity (18).

Thus, in another variant of the invention, a portion of the hydrogen stream is directed via the pipe (50) to a combustion chamber (15) so as to produce electricity (18) with the air that is brought via a pipe (17). The hot gases that are obtained from combustion are recycled via the pipe (20) to the steam-reforming reactor (11) that in this case is preferably a Hygensys® reactor-exchanger. Another portion of the hydrogen is exported via the pipe (52).

Formation Conditions of Hydrates:

The process for formation/separation of hydrates is carried out in an environment that comprises water—component of hydrates—and a non-water-miscible solvent. At least one amphiphilic compound that has the property of lowering the formation temperature of hydrates and/or of modifying the mechanisms of formation and agglomeration is preferably added to this mixture. These modifications can be taken advantage of in particular for the transport of the hydrate dispersion.

The proportions of the water/solvent mixture can be respectively between 0.5/99.5 to 60/40% by volume, and preferably between 10/90 and 50/50%, and more preferably between 20/80 and 40/60% by volume.

The amphiphilic compounds are chemical compounds (monomer or polymer) having at least one hydrophilic or polar chemical group, exhibiting a high affinity with the aqueous phase and at least one chemical group that has a high affinity with the solvent (commonly referred to as hydrophobic).

During the contact of a water phase with a gas that can form hydrates, on the one hand, a low conversion rate of the water into hydrate essentially due to the weak solubility of gases in water is observed, and, on the other hand, during the formation of these hydrates, a heavy agglomeration of the particles among themselves, leading to the formation of solid blocks, plugs or deposits that make the system unpumpable, is observed.

With the water/solventlamphiphilic compound systems, it is observed that by putting the gas to be treated in contact with these mixtures, there is obtained:

With a judicious selection of the solvent, a possible preferred solubilization of the acid compound or compounds of the gas to be treated in the solvent, Under suitable pressure and temperature conditions, a formation of acid compound-enriched hydrates under favorable thermodynamic conditions and with a high conversion rate of water into hydrate, With suitable amphiphilic compounds, particles of hydrates that are not aggregated in the solvent are obtained. The formation of hydrate blocks is therefore prevented, and dispersion of the hydrate particles remains feasible.

These advantageous properties are found in a very broad range of temperatures and pressures.

The amphiphilic compound can be added to said mixture in a proportion of between 0.1 and 10% by weight, and preferably between 0.1 and 5% by weight, relative to the non-miscible phase in the aqueous phase, i.e., the solvent.

The solvent that is used for the process can be selected from among several families: hydrocarbon solvents, silicone-type solvents, halogenated solvents or perhalogenated solvents.

In the case of hydrocarbon solvents, the solvent can be selected from among:

Aliphatic fractions, for example isoparaffinic fractions that have a high enough flash point to be compatible with the process according to the invention, Organic solvents such as aromatic fractions or naphthenic fractions can also be used with the same flash point conditions, Products that are pure or in mixtures that are selected from among branched alkanes, cycloalkanes, and alkylcycloalkanes, aromatic compounds, and alkylaromatic compounds.

The hydrocarbon solvent that is used for the process in general has a flash point that is higher than 40° C., preferably higher than 75° C., and more specifically higher than 100° C. Its crystallization point is less than −5° C.

The silicone-type solvents, by themselves or in mixtures, are selected from among, for example:

Linear polydimethylsiloxanes (PDMS) of the $(CH_3)_3$—$SiO$—$[(CH_3)_2$—$SiO]_n$—$Si(CH_3)_3$ type with n between 1 and 900, corresponding to viscosities at ambient temperature of between 0.1 and 10,000 mPa·s, Polydiethylsiloxanes in the same viscosity range, $D_4$ to $D_{10}$, and preferably $D_5$ to $D_8$, cyclic polydimethylsiloxanes.

The pattern D represents the dimethylsiloxane monomer unit,

The poly(trifluoropropyl methyl siloxane).

The halogenated or perhalogenated solvents for the process are selected from among the perfluorocarbons (PFC), the hydrofluoroethers (HFE), and the perfluoropolyethers (PFPE).

The halogenated or perhalogenated solvent that is used for the process in general has a boiling point that is greater than or equal to 70° C. at atmospheric pressure, and its viscosity is less than 1 Pa·s at ambient temperature and at atmospheric pressure.

The amphiphilic compounds comprise a hydrophilic part that can be either neutral, anionic, cationic, or else zwitterionic. The part that has a strong affinity to the solvent (referred to as hydrophobic) can contain either hydrocarbon, or silicone, or fluoro-silicone, or else be halogenated or perhalogenated.

The amphiphilic hydrocarbon compounds that are used by themselves or in mixtures to facilitate the formation and/or the transport of hydrates according to this invention are selected from among non-ionic, anionic, cationic or zwitterionic amphiphilic compounds.

The non-ionic compounds that are used for the process in general contain:
  A hydrophilic part that comprises either alkylene oxide groups, hydroxy groups, or else amino alkylene groups,
  A hydrophobic part that comprises a hydrocarbon chain that is derived from an alcohol, a fatty acid, an alkylated derivative of a phenol or a polyolefin, for example derived from isobutene or butene.

The connection between the hydrophilic part and the hydrophobic part can be, for example, an ether, ester or amide group. This connection can also be obtained by a nitrogen or sulfur atom.

Among the non-ionic amphiphilic hydrocarbon compounds, it is possible to mention the oxyethylated fatty alcohols, the alkoxylated alkylphenols, the oxyethyl and/or oxypropyl derivatives, the sugar ethers, the polyol esters, such as glycerol, polyethylene glycol, sorbitol and sorbitan, the mono- and diethanol amides, the carboxylic acid amides, the sulfonic acids, or the amino acids.

The anionic amphiphilic hydrocarbon compounds that are used for the process in general contain one or more functional groups that can be ionized in the aqueous phase to form negatively-charged ions. These anionic groups provide the surface activity of the molecule. Such a functional group is an acid group that is ionized by a metal or an amine. The acid can be, for example, a carboxylic acid, sulfonic acid, sulfuric acid, or phosphoric acid.

Among the anionic amphiphilic hydrocarbon compounds, it is possible to mention:
  Carboxylates such as metal soaps, alkaline soaps, or organic soaps (such as N-acyl amino acids, N-acyl sarcosinates, N-acyl glutamates, and N-acyl polypeptides),
  Sulfonates such as alkylbenzenesulfonates (i.e., alkoxylated alkylbenzenesulfonates), paraffins and olefin sulfonates, lignosulfonates, or sulfosuccinic derivatives (such as sulfosuccinates, hemisulfosuccinates, dialkylsulfosuccinates, for example sodium dioctyl-sulfosuccinate),
  Sulfates such as alkyl sulfates, alkyl ether sulfates, and phosphates.

The cationic amphiphilic hydrocarbon compounds that are used for the process in general contain one or more functional groups that can be ionized in the aqueous phase to form positively-charged ions. These cationic groups provide the surface activity of the molecule.

Among the cationic hydrocarbon compounds, it is possible to mention:
  The alkylamine salts such as
    the alkylamine ethers,
    the quaternary ammonium salts such as the alkyl trimethylammonium derivatives or the tetraalkylammonium derivatives or else the alkyl dimethyl benzyl ammonium derivatives,
    the alkyloxylated alkyl amine derivatives
  The derivatives of sulfonium or phosphonium, for example the tetraalkyl phosphonium derivatives,
  The heterocyclic derivatives, such as the pyridinium, imidazolium, quinolinium, piperidinium, or morpholinium derivatives.

The zwitterionic hydrocarbon compounds that are used for the process in general have at least two groups that can be ionized, such that at least one is charged positively and at least one is charged negatively, whereby the groups are selected from among the anionic and cationic groups that are described above, such as, for example, the betaines, the alkyl amido betaine derivatives, sulfobetaines, phosphobetaines, or else carboxybetaines.

The amphiphilic compounds, comprising a neutral, anionic, cationic or zwitterionic hydrophilic part, can also have a silicone or fluoro-silicone hydrophobic part (defined as exhibiting a strong affinity with the non-water-miscible solvent). These oligomeric or polymeric silicone amphiphilic compounds can also be used for the water/organic solvent or water/halogenated or perhalogenated solvent or else water/silicone solvent mixtures.

The neutral silicone amphiphilic compounds can be PDMS-type oligomers or copolymers in which the methyl groups are partially replaced by alkylene polyoxide groups (such as ethylene polyoxide, propylene polyoxide, or an ethylene polyoxide and propylene mixture polymer) or pyrrolidone groups such as the PDMS/hydroxy-alkylene oxypropylmethyl siloxane derivatives or else alkyl methyl siloxane/hydroxy-alkylene oxypropylmethyl siloxane derivatives.

These copolyols that are obtained by hydrosilylation reaction have reactive final hydroxyl groups. They can therefore be used to produce ester groups, for example by reaction of a fatty acid, or else alkanolamide groups, or else glycoside groups.

Silicone polymers that comprise lateral alkyl groups (hydrophobes) that are directly linked to the silicon atom can also be modified by reaction with fluoro-type alcohol (hydrophilic) molecules to form amphiphilic compounds.

The surfactant properties are adjusted with the hydrophilic group/hydrophobic group ratio.

The PDMS copolymers can also be made amphiphilic by anionic groups, such as phosphate, carboxylate, sulfate or else sulfosuccinate groups. These polymers are generally obtained by reaction of acids on the final hydroxide functions of lateral chains of alkylene polyoxide of polysiloxane.

The PDMS copolymers can also be made amphiphilic by cationic groups, such as quaternary ammonium groups, quaternized alkyl amido amine groups, or quaternized alkyl alkoxy amine groups or else a quaternized amine imidazoline. It is possible to use, for example, the PDMS/trimethyl ammonium methyl siloxane benzyl chloride copolymer or else the halo-N-alkyl-N,N-dimethyl-(3-siloxanylpropyl)ammonium derivatives.

The PDMS copolymers can also be made amphiphilic by betaine-type groups such as carboxybetaine, an alkyl amido betaine, a phosphobetaine, or else a sulfobetaine. In this case, the copolymers will comprise a hydrophobic siloxane chain and, for example, a hydrophilic organobetaine part of general formula:

(Me$_3$SiO)(SiMe$_2$O)$_a$(SiMeRO)SiMe$_3$ with R=(CH$_2$)$_3$$^{+NMe}$$_2$(CH$_2$)$_b$COO$^-$; a=0.10; b=1.2

The amphiphilic compounds, comprising a neutral, anionic, cationic, or zwitterionic hydrophilic part, can also have a halogenated or perhalogenated hydrophobic part (defined as having a strong affinity with the non-water-miscible solvent). These oligomeric or polymeric, halogenated amphiphilic compounds can also be used for the water/organic solvent or water/halogenated or perhalogenated solvent or else water/silicone solvent mixtures.

The halogenated amphiphilic compounds, such as, for example, the fluorinated compounds, can be ionic or non-ionic. In particular, it is possible to cite:

The non-ionic amphiphilic halogenated or perhalogenated compounds, such as the compounds that correspond to the general formula Rf(CH$_2$)(OC$_2$H$_4$)$_n$OH, in which Rf is a partially hydrogenated perfluorocarbonated or fluorocarbonated chain in which n is an integer that is at least equal to 1, the fluorinated non-ionic surfactants of polyoxyethylene-fluoroalkyl ether type, The ionizable amphiphilic compounds for forming anionic compounds, such as the perfluorocarboxylic acids, and their salts, or the perfluorosulfonic acids and their salts, the perfluorophosphate compounds, the mono- and dicarboxylic acids that are derived from the perfluoropolyethers, and their salts, the mono- and disulfonic acids that are derived from the perfluoropolyethers, and their salts, the perfluoropolyether phosphate amphiphilic compounds and the perfluoropolyether diphosphate amphiphilic compounds, the perfluorinated cationic or anionic amphiphilic halogenated compounds or those that are derived from perfluoropolyethers that have 1, 2 or 3 lateral hydrophobic chains, ethoxylated fluoroalcohols, fluorinated sulfonamides, or fluorinated carboxamides.

The process, object of the invention, therefore makes it possible to produce a stream of pure hydrogen by recovering the impurities that are present (CH$_4$, CO$_2$) in the form of hydrates. The CO$_2$ and the methane that are thus recovered can be regenerated—in particular in the case of methane—for being recycled in the process. The hydrogen-rich stream can be used to produce electricity without CO$_2$ emission.

This invention therefore offers the following advantages:
Making it possible to prevent the loss of methane with the stream of hydrogen that is produced.
Making possible the almost complete recovery of CO$_2$.
Making possible the recycling in terms of pressure of methane to the input of the steam-reforming reactor without a compressor.
Making it possible to be less restrictive on the conversion of the vapor-reforming reactor upstream and therefore to make gains on the service life of the tubes (exchange surfaces) of the steam-reforming reactor.
Economic gain.

The invention is entirely usable for another feedstock (evaporated light naphtha, for example). In this case, the recycled methane would be mixed with the evaporated naphtha feedstock before input into the SMR.

The following examples illustrate this invention.

EXAMPLES

The operating conditions as well as the composition of different streams during processes that are illustrated in Examples 1 and 2 below are summed up in Table A below, in the case of, for example, a steam-reforming that operates at 4 MPa.

TABLE A (The stream 70 relates only to the process according to the invention).

| Stream No. | Pressure (MPa) | Temperature (° C.) |
|---|---|---|
| 1 | 7 | Ambient |
| 2 | 4 | 350 |
| 30 | 4 | 300 (After Cooling) |
| 40 | 4 | 1 (After Cooling) |
| 60 | 0.2/4 | Ambient |
| 50 | 4 | 1 (After Cooling) |
| 70 | 4 | Ambient |

Example 1 According to the Prior Art

Figure 1:
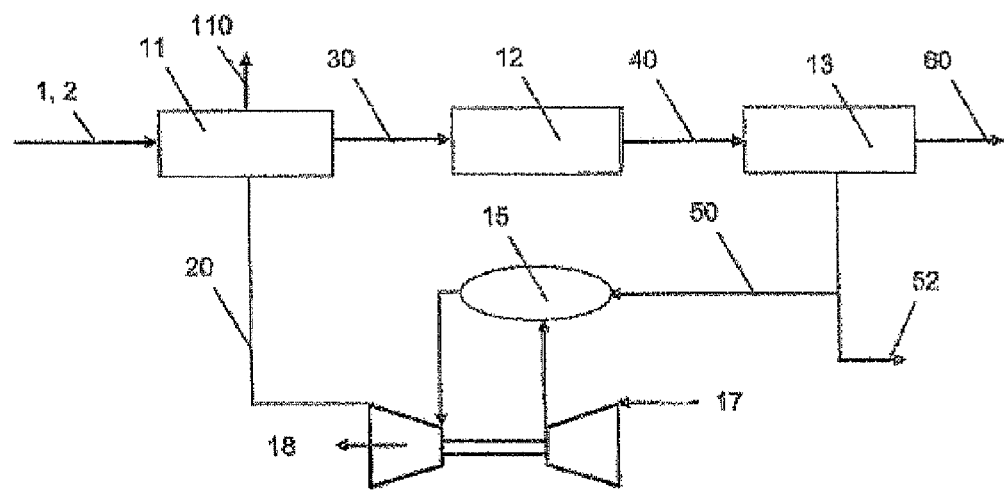
FIG. 1 shows the conventional diagram of the process for the production of hydrogen according to the prior art.

The following table sums up the results that are obtained during the purification of hydrogen by a chemical absorption unit as described in FIG. 1 and that is known to one skilled in the art.

TABLE B (The stream 1 also contains C$_2$H$_6$ = 7; C$_3$H$_8$ = 1, i-C$_4$H$_{10}$ = 0.05, n-C$_4$H$_{10}$ = 0.05, i-C$_5$H$_{12}$ = 0.005, C$_6$H$_{14}$ = 0.001, H$_2$S = 0.0015, N$_2$ = 0.89, So$_2$ = 0.0001, i-C$_4$H$_{10}$ = 0.05)

| Composition | Stream No. | | | |
|---|---|---|---|---|
| (mol %) | 1 | 40 | 50 | 60 |
| H$_2$ |  | 60 | 92.3 | 0 |
| CO$_2$ | 2 | 15 | 0 | 96.3 |
| CH$_4$ | 89 | 5 | 7.7 | 0 |
| H$_2$O |  | 20 | 0 | 3.7 |
| Pressure (MPa) | 7 | 4 | 4 | 0.2 |
| Flow Rate (Kmol/h) |  | 100 | 65 | 15.6 |
| Temperature (° C.) | Ambient | 1 | 1 | 40 |

With the process according to the prior art, the hydrogen purity is only 92.3%, whereby the primary impurity is methane, compound that produces CO$_2$ during the subsequent combustion of the hydrogen stream. The recovery rate of CO$_2$ with this type of process is only 75%.

Example 2 According to the Invention

This example illustrates the process for the production of hydrogen according to the invention with reference to the implementation of FIG. 4. The stream that exits from the conversion stage (40) is cooled to be under the conditions of the formation of hydrates. Table C below sums up the results that are obtained.

TABLE C (The stream 1 also contains $C_2H_6 = 7$; $C_3H_8 = 1$, $i\text{-}C_4H_{10} = 0.05$,
$n\text{-}C_4H_{10} = 0.05$, $i\text{-}C_5H_{12} = 0.005$, $C_6H_{14} = 0.001$, $H_2S = 0.0015$,
$N_2 = 0.89$, $So_2 = 0.0001$, $i\text{-}C_4H_{10} = 0.05$)

| Composition | Stream No. | | | |
|---|---|---|---|---|
| (mol %) | 1 | 40 | 50 | 60 |
| $H_2$ |  | 60 | 98.9 | 0 |
| $CO_2$ | 2 | 15 | 0.9 | 74.9 |
| $CH_4$ | 89 | 5 | 0.2 | 25.1 |
| $H_2O$ |  | 20 | 0 | 0 |
| Pressure (MPa) | 7 | 4 | 4 | 4 |
| Flow Rate (Kmol/h) |  | 100 | 60.7 | 19.34 |
| Temperature (° C.) | Ambient | 1 | 1 | 20 |

The hydrogen stream (50) that is obtained by the process according to the invention has a very good purity (98.9%) and is almost free of methane (0.2%). The stream of methane and $CO_2$ (60) that exits from the separation reactor (R2) is obtained at high pressure (4 MPa) and can be separated in a subsequent stage (R3) by chemical absorption, for example. The recovery rate of $CO_2$ is 96.6% and is therefore very superior to the one that is obtained with the process of the prior art. This example thus shows that the process according to the invention is therefore more effective in terms of hydrogen purification and $CO_2$ recovery.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 08/06.509, filed Nov. 20, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of hydrogen from natural gas and water vapor comprising:
    producing a synthesis gas in a vapor-reforming unit of the hydrocarbon feedstock in the presence of water vapor, whereby a fuel provides heat necessary for reaction, shift conversion of the synthesis gas that is obtained to produce a stream containing additional hydrogen, additional carbon dioxide and residual methane,
    at 0-60° C. and a pressure of 0.2-6 MPa recovering carbon dioxide and methane, present in the stream that is obtained in the shift conversion, in the form of hydrates in the presence of a non-water miscible solvent and at least one amphiphilic compound, and separating a stream enriched in hydrogen,
    simultaneously regenerating methane and carbon dioxide at 0-40° C. and a pressure of 0.2-6 MPa,
    recycling a methane stream obtained by regeneration to input of vapor reforming,
    the amphiphilic compound being
    a compound of the formula $Rf(CH_2)(OC_2H_4)_n OH$, in which Rf is a partially hydrogenated perfluorocarbonated or fluorocarbonated chain in which n is an integer at least equal to 1.

2. The process for the production of hydrogen according to claim 1, comprising producing electricity from the stream enriched in hydrogen obtained in the recovery of carbon dioxide and methane.

3. The process for the production of hydrogen according to claim 2, in which the production of electricity is carried out by sending the stream enriched in hydrogen into a combustion chamber.

4. The process for the production of hydrogen according to claim 3, in which hot flue gasses that are obtained at the end of combustion in the combustion chamber are recycled to the vapor-reforming unit.

5. A process according to claim 1, wherein the non-water miscible solvent is a hydrocarbon, a silicone, or a halogenated or perhalogenated solvent.

6. A process according to claim 5, wherein the non-water miscible solvent is an isoparaffinic fraction, a naphthenic fraction, an aromatic fraction, an alkyl aromatic compound, an alkane, cycloalkane or alkylcycloalkane having a flash point higher than 40° C. and a crystallization point less than −5° C.

7. A process according to claim 5, wherein the silicone is a linear polymethyldisiloxane of the formula $(CH_3)_3$—$SiO$—$[(CH_3)_2$—$SiO]_n$—$Si(CH_3)_3$, in which n is 1-900, having a viscosity at ambient temperature of 0.1-10,000 mPa·s, a polyethylsiloxane having a viscosity at ambient temperature of 0.1-10,000 mPa·s, a $D_{4\text{-}10}$-cyclic polydimethylsiloxane, in which D represents the dimethylsiloxane monomer unit, or polytrifluoropropyl methyl siloxane.

8. A process according to claim 5, wherein the halogenated or perhalogenated solvent is a perfluorocarbon, a hydrofluoroether or a perfluoropolyether, having a boiling point ≥70° C. at atmospheric pressure and a viscosity less than 1 Pa·s at ambient temperature and atmospheric pressure.

* * * * *